UNITED STATES PATENT OFFICE.

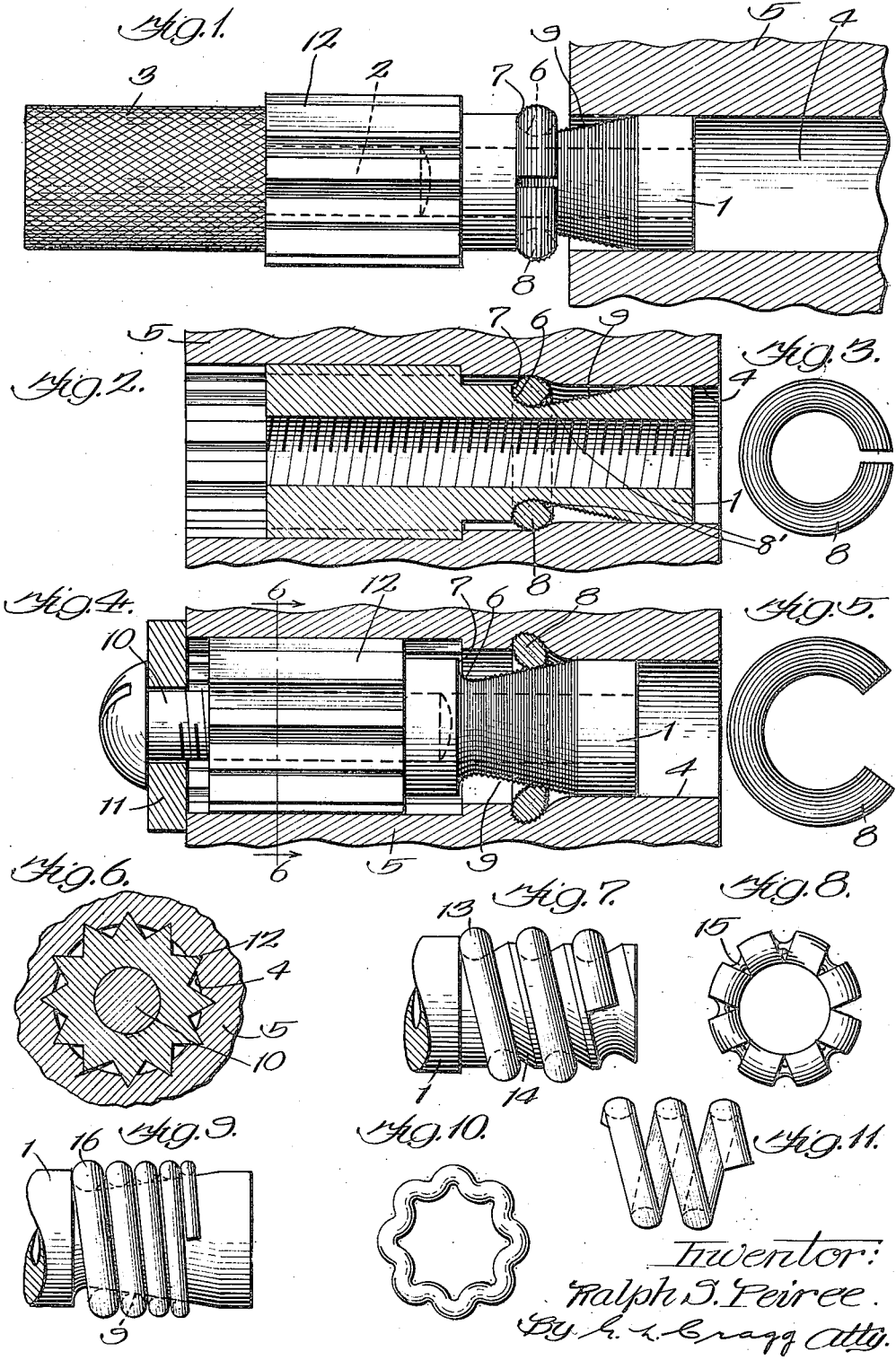

RALPH S. PEIRCE, OF HINSDALE, ILLINOIS.

ATTACHING DEVICE.

1,407,570.

Specification of Letters Patent.  Patented Feb. 21, 1922.

Application filed February 2, 1920. Serial No. 355,634.

*To all whom it may concern:*

Be it known that I, RALPH S. PEIRCE, citizen of the United States, residing at Hinsdale, in the county of Du Page and State of Illinois, have invented a certain new and useful Improvement in Attaching Devices, of which the following is a full, clear, concise, and exact description.

My invention relates to attaching devices that are disposed in carriers such as walls and other structural parts and has for its object the formation of an improved and simplified structure. The device of my invention includes an element having an inner portion which is reduced to form a forward shoulder and an expansible element having holding engagement with the wall portion or other structural element or carrier to which the attaching device is to be applied. After the attaching device has been assembled with the wall or other carrier it may be employed for its original purpose of effecting assembly between the carrier and an object to be supported thereby or attached thereto.

The device of my invention is of particular utility when combined with carriers formed of wood, such for example as wooden structural portions of aeroplanes. The shouldered element may be threaded to provide a screw or bolt hole having permanent threads with which a screw or bolt may have engagement to be in permanent assembly with the wooden carrier, the threads being permanent since the shouldered element is preferably made of sufficiently hard metal.

In the preferred embodiment of the invention the shouldered element has an inner portion provided with a conical formation sloping forwardly toward the base of the shoulder, the expansible element preferably surrounding this conical portion and being expanded thereby when the shouldered element is drawn forwardly by the action of a screw.

I will explain my invention more fully by reference to the accompanying drawing showing the preferred embodiment thereof and some modifications of parts and in which Fig. 1 is a longitudinal view in elevation of the attaching device of my invention in association with a carrier that is shown in section, this figure illustrating the initial entry of the shouldered element of the attaching device within the recess formed in the carrier; Fig. 2 is a view showing a portion of the shouldered element of Fig. 1 within the recess of the carrier and in longitudinal section, the complemental portion of the shouldered element being removed to permit of the substitution of another element therefor; Fig. 3 illustrates an expansible ring employed in the structure of Fig. 2 as the expansible element prior to the expansion thereof; Fig. 4 illustrates the structure of Fig. 2 after the relation of the parts have been modified due to the action of a bolt entering the threaded bore of the shouldered element and serving to draw the shouldered element forward to expand the expansible ring into the material of the carrier, if the carrier is of a material that will permit of this result, such expansible ring otherwise merely gripping the material of the carrier; Fig. 5 illustrates the modified shape of the expansible ring of Fig. 4; Fig. 6 is a sectional view on line 6—6 of Fig. 4; and Figs. 7, 8, 9, 10 and 11 illustrate modified forms of the expansible device.

Like parts are indicated by similar characters of reference throughout the different figures.

I have illustrated a sleeve 1 having a threaded bore and an external element having a threaded stem 2 and a head 3 larger than the stem and preferably formed to receive hammer blows in order that said sleeve may be driven into the bore 4 of a wall 5 or other carrier. The driven element is reduced at 6 to form a forward shoulder 7 that is preferably a permanent part of the sleeve 1 but to which characteristic I do not wish to limit the invention.

The expansible element is preferably in the form of a split ring 8 that initially surrounds the reduced portion of the sleeve adjacent the shoulder 7 that has no expanding action on the ring. There is desirably a conical portion 9 upon the sleeve 1 sloping forwardly toward the base of the shoulder 7. The expansible ring 8 surrounds this conical portion and is initially of larger diameter than the bore 4 of the carrier 5 so as to insure its firm engagement with said carrier when the driven element is driven into the bore by the application of hammer blows to the portion 3 thereof. When this driven element is driven within the recess 4 the shoulder 7 will carry the expansible ring 8 into said recess without expanding the ring. As illustrated in Fig. 2 the sleeve 1 is driven further into the carrier than the position it is ultimately to occupy. After being so driven the element 2—3 is unscrewed from the sleeve and withdrawn, being replaced by the bolt 10 and the washer 11, which latter may be a part of the object to be supported. When the bolt 10 has been screwed into the bore of the sleeve 1 sufficiently to press the washer 11 home against the carrier 5 the bolt is thereafter effective, upon continued turning thereof, to draw the sloping element 9 forwardly with reference to the expansible element 8 to cause the conical portion 9 to expand this element. The expansible element 8 is desirably in the form of a wire or metal band shaped to permit of the enlargement of its bore as the conical element 9 is drawn forwardly with reference to this band. Before expansion of the expansible element the cross section of such element has a greater dimension extending longitudinally of the expansible element (Fig. 2) so that after the conical element 9 has been drawn forward the band will be turned or twisted to have such greater dimension oblique or approach perpendicularity to the axis of the bore of the band, the bore of the sleeve surrounded by the band, and the bore in the carrier 5 receiving the device, whereby the gripping effect of the band is increased. In order to further prevent the sleeve 1 from being turned when the bolt 10 is turned the outer end of such sleeve may be provided with flutes, ribs or projections 12 preferably extending longitudinally of the sleeve and driven into the material of the carrier 5 to afford an engagement between the carrier and the sleeve that will prevent the rotary movement of the sleeve with respect to the carrier while at the same time permitting the bolt 10 to draw the sleeve forwardly. After the parts have been assembled as illustrated in Fig. 4, the bolt 10 may remain in place or may be replaced by some other object which it is desired to insert within the bore of the sleeve 1, if the part 11 does not happen to be the device, or a part of the device, which is to be supported.

In the preferred embodiment of the invention, the portions 8 and 9 are provided with roughened surfaces, preferably formed by annular co-axial ridges circumscribing these parts, whereby the part 8 may be surely twisted as it is forced along the conical part 9. The part 8 preferably has a flattened conical surface 8′ which ultimately engages the conical part 9 to obstruct further twisting of the element 8 and hold it seated upon cone 9.

In Fig. 7 I have illustrated an expansible device 13 in the form of a spiral wire surrounding a spiral groove 14 in the sleeve 1, this groove having forwardly sloping surfaces engageable with the wire spiral 13 to expand the same when the sleeve 1 is drawn forwardly.

Fig. 8 shows a modification of the band 8 of Figs. 3 and 5, the structure of Fig. 8 being reduced at intervals as indicated at 15. The parts 15 are weakened portions which make the band that includes them ductile at these parts. The parts 15 may be otherwise assembled.

In Fig. 9 the wire coil 16 is illustrated, the wire of which is reduced in diameter as the coil progresses toward the rear of the structure. The sleeve 1 has a conical forwardly tapering portion 9 that may co-act with the coil 16 to expand it as the sleeve 1 is drawn forwardly.

Fig. 10 illustrates another modification of the band 8, the band illustrated in Fig. 10 being corrugated or of wavy form as illustrated to permit its enlargement.

In Fig. 11 there is illustrated a spiral coil which may have the preferred cross section of the band that is illustrated in Fig. 2.

While I have herein shown and particularly described the preferred embodiments of my invention I do not wish to be limited to the precise details of construction shown as changes may readily be made without departing from the spirit of my invention, but having thus described my invention I claim as new and desire to secure by Letters Patent the following:—

1. An attaching device including an element receivable within a recess in a carrier and having an inner portion which is reduced to form a forward shoulder; and an expansible element behind the shoulder for holding the first aforesaid element and its carrier together, said shoulder being formed to have substantially no expanding action upon the expansible element.

2. An attaching device including an element receivable within a recess in a carrier and having an inner portion which is reduced to form a forward shoulder; and an expansible element that is expansible by said inner portion into engagement with the carrier, said shoulder being formed to have substantially no expanding action upon the expansible element.

3. An attaching device including an element receivable within a recess in a carrier and having an inner portion which is reduced to form a forward shoulder and having a portion sloping forwardly toward the base of the shoulder; an expansible element that is expansible by said sloping portion into engagement with the carrier; and means for drawing the first aforesaid element forwardly to cause said sloping portion to expand the expansible element.

4. An attaching device including an element receivable within a recess in a carrier and having an inner portion which is reduced to form a forward shoulder and having a conical portion sloping forwardly toward the base of the shoulder; an expansible element substantially surrounding said conical portion and expansible thereby; and means for drawing the first aforesaid element forwardly to cause said sloping portion to expand the expansible element.

5. An attaching device including an element receivable within a recess in a carrier and having a threaded bore and an inner portion which is reduced to form a forward shoulder; an expansible element behind the shoulder for holding the first aforesaid element and its carrier together; and a bolt in threaded engagement with the threaded bore of the first aforesaid element and operating, when turned in suitable direction, to force outward movement of the first aforesaid element to force expansion of the expansible element.

6. An attaching device including an element receivable within a recess in a carrier and having a threaded bore and an inner portion which is reduced to form a forward shoulder; an expansible element that is expansible by said inner portion into engagement with the carrier; and a bolt in threaded engagement with the threaded bore of the first aforesaid element and operating, when turned in suitable direction, to force outward movement of the first aforesaid element to force expansion of the expansible element.

7. An attaching device including an element receivable within a recess in a carrier and having a threaded bore and an inner portion which is reduced to form a forward shoulder and having a portion sloping forwardly toward the base of the shoulder; an expansible element that is expansible by said sloping portion into engagement with the carrier; and a bolt in threaded engagement with the threaded bore of the first aforesaid element and operating, when turned in suitable direction, to force outward movement of the first aforesaid element to force expansion of the expansible element.

8. An attaching device including an element receivable within a recess in a carrier and having a threaded bore, and an inner portion which is reduced to form a forward shoulder and having a conical portion sloping forwardly toward the base of the shoulder; an expansible element substantially surrounding said conical portion and expansible thereby; and a bolt in threaded engagement with the threaded bore of the first aforesaid element and operating, when turned in suitable direction, to force outward movement of the first aforesaid element to force expansion of the expansible element.

9. An attaching device including an element receivable within a recess in a carrier and having an inner portion which is reduced to form a forward shoulder; and an expansible element behind the shoulder for holding the first aforesaid element and its carrier together, said shoulder being formed to have substantially no expanding action upon the expansible element and the first aforesaid element having a projection thereon engageable with said carrier to prevent said element from turning.

10. An expansible device for assembling carriers and inserts therein which is formed of a band of metal shaped to permit of the enlargement of its bore to permit its expansion, the material of said expansible device being formed of wire which, in cross section, has a greater dimension extending longitudinally of the bore of the band; in combination with means for expanding said band of metal.

11. An expansible device for assembling carriers and inserts received in bores provided in the carriers which expansible device, in cross section, has a greater dimension extending longitudinally of the bore of the expansion device; in combination with means for turning said expansible device to cause the aforesaid greater dimension thereof to approach perpendicularity to the axis of the bore.

12. An expansible device for assembling carriers and inserts received in bores provided in the carriers; in combination with a forwardly tapering element; and means to relatively move said tapering device and said expansible element to rock said expansible device upon said tapering element rearwardly with respect thereto.

13. An expansible device for assembling carriers and inserts received in bores provided in the carriers; in combination with a forwardly tapering element; and means for drawing said tapering element forwardly to roll said expansible device upon said forwardly tapering element rearwardly with respect thereto.

In witness whereof, I hereunto subscribe my name this 26th day of January A. D., 1920.

RALPH S. PEIRCE.